(12) United States Patent　　(10) Patent No.:　US 12,683,760 B2
　　Ichikawa　　　　　　　　　　　　(45) Date of Patent:　Jul. 14, 2026

(54) TERMINAL DEVICE, COMPUTER PROGRAM, COMMUNICATION SYSTEM, AND COMMUNICATION METHOD

(71) Applicant: AISLE SOFT CORPORATION, Aichi (JP)

(72) Inventor: Mitsuyuki Ichikawa, Aichi (JP)

(73) Assignee: AISLE SOFT CORPORATION, Aichi (JP)

( * ) Notice: Subject to any disclaimer, the term of this patent is extended or adjusted under 35 U.S.C. 154(b) by 225 days.

(21) Appl. No.: 17/928,672

(22) PCT Filed: Aug. 14, 2020

(86) PCT No.: PCT/JP2020/030888
　　§ 371 (c)(1),
　　(2) Date: Nov. 30, 2022

(87) PCT Pub. No.: WO2022/034684
　　PCT Pub. Date: Feb. 17, 2022

(65) Prior Publication Data
　　US 2023/0188323 A1　　Jun. 15, 2023

(51) Int. Cl.
　　*H04L 9/06*　　　　(2006.01)
　　*H04L 67/562*　　　(2022.01)

(52) U.S. Cl.
　　CPC .......... *H04L 9/0618* (2013.01); *H04L 67/562* (2022.05)

(58) Field of Classification Search
　　CPC ............................ H04L 9/0618; H04L 67/562
　　USPC ......................................................... 380/28
　　See application file for complete search history.

(56) References Cited

U.S. PATENT DOCUMENTS

| | | | |
|---|---|---|---|
| 2002/0199121 A1 | 12/2002 | Stanford-Clark | |
| 2008/0107272 A1 | 5/2008 | Carmeli et al. | |
| 2011/0033046 A1* | 2/2011 | Nonaka ................. | H04L 9/3093 |
| | | | 380/46 |
| 2019/0288975 A1* | 9/2019 | Hara ........................ | G06F 13/00 |

(Continued)

FOREIGN PATENT DOCUMENTS

| | | |
|---|---|---|
| CN | 108494554 | 9/2018 |
| EP | 3428865 | 1/2019 |

(Continued)

OTHER PUBLICATIONS

International Search Report (ISR) from International Searching Authority (Japan Patent Office) in International Pat. Appl. No. PCT/JP2020/030888, dated Nov. 2, 2020, together with an English language translation.

*Primary Examiner* — Linglan Edwards
*Assistant Examiner* — Phuc Pham
(74) *Attorney, Agent, or Firm* — Greenblum & Bernstein, P.L.C.

(57) ABSTRACT

The cipher message data is distributed to an external device while ensuring the confidentiality of the cipher message data. A terminal device performs communication with an external device through a broker on the basis of a publish-subscribe message model. The terminal device includes: an acquisition unit that acquires external data; an encryption processing unit that encrypts at least a part of the external data to generate cipher message data including ciphertext; and a data distribution unit that distributes an encrypted publish message including topic designation data of plaintext and the cipher message data to the broker.

13 Claims, 7 Drawing Sheets

(56)                     References Cited

U.S. PATENT DOCUMENTS

2020/0396054 A1 * 12/2020 Wu ....................... G06F 3/0659
2022/0294613 A1     9/2022 Fischer et al.

FOREIGN PATENT DOCUMENTS

| EP | 3428865 A1 * | 1/2019 |
|----|----|----|
| EP | 3661113 | 6/2020 |
| JP | 2008-503950 | 2/2008 |
| JP | 2008-193612 | 8/2008 |
| JP | 2015-041319 | 3/2015 |
| JP | 2018-013960 | 1/2018 |
| WO | 2018/096641 | 5/2018 |

* cited by examiner

Figure 3:
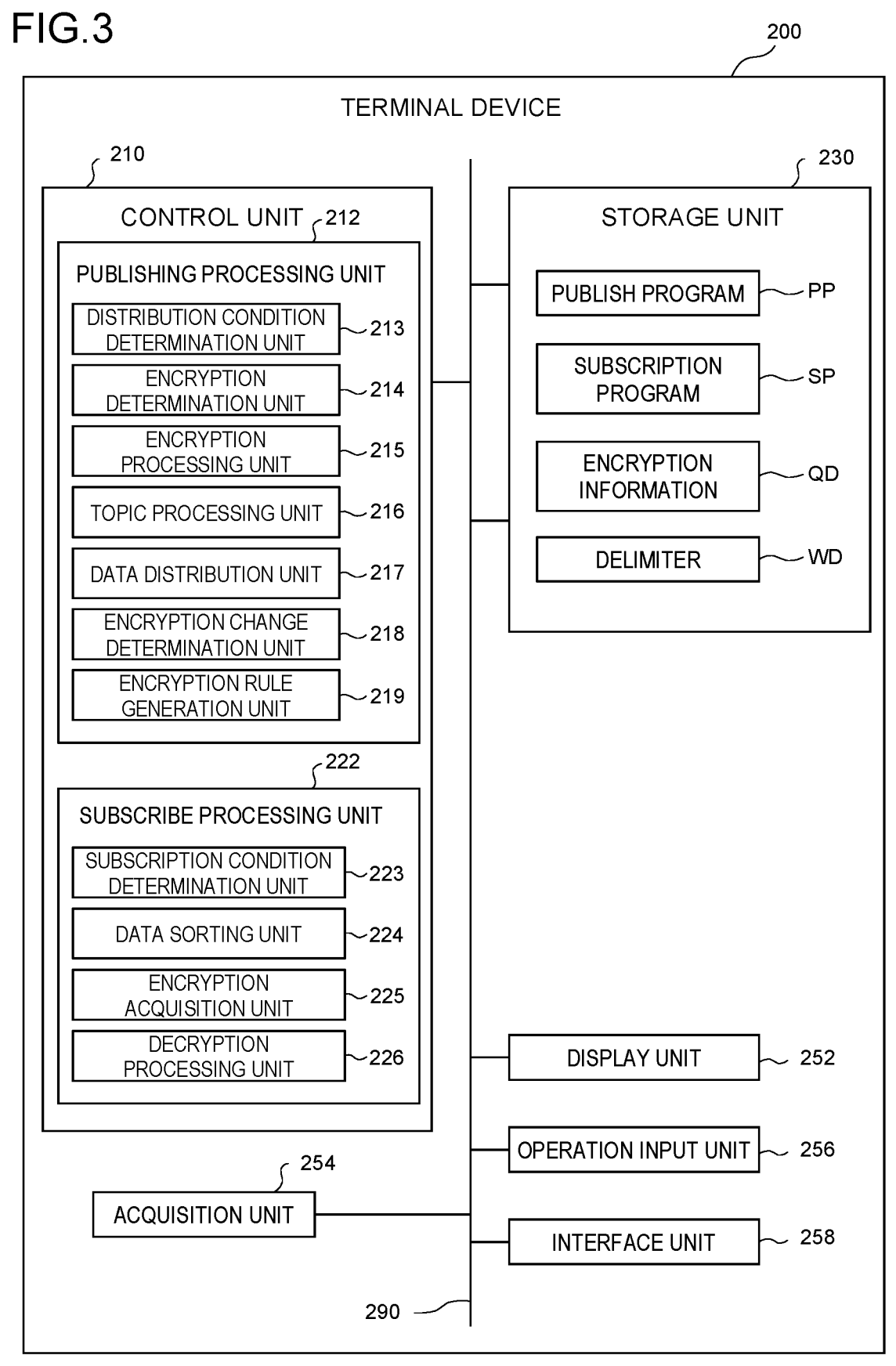

TERMINAL DEVICE

210 — CONTROL UNIT — 212

PUBLISHING PROCESSING UNIT

| DISTRIBUTION CONDITION DETERMINATION UNIT | 213 |
| ENCRYPTION DETERMINATION UNIT | 214 |
| ENCRYPTION PROCESSING UNIT | 215 |
| TOPIC PROCESSING UNIT | 216 |
| DATA DISTRIBUTION UNIT | 217 |
| ENCRYPTION CHANGE DETERMINATION UNIT | 218 |
| ENCRYPTION RULE GENERATION UNIT | 219 |

222 — SUBSCRIBE PROCESSING UNIT

| SUBSCRIPTION CONDITION DETERMINATION UNIT | 223 |
| DATA SORTING UNIT | 224 |
| ENCRYPTION ACQUISITION UNIT | 225 |
| DECRYPTION PROCESSING UNIT | 226 |

230 — STORAGE UNIT

| PUBLISH PROGRAM | PP |
| SUBSCRIPTION PROGRAM | SP |
| ENCRYPTION INFORMATION | QD |
| DELIMITER | WD |

DISPLAY UNIT — 252

OPERATION INPUT UNIT — 256

254 — ACQUISITION UNIT

INTERFACE UNIT — 258

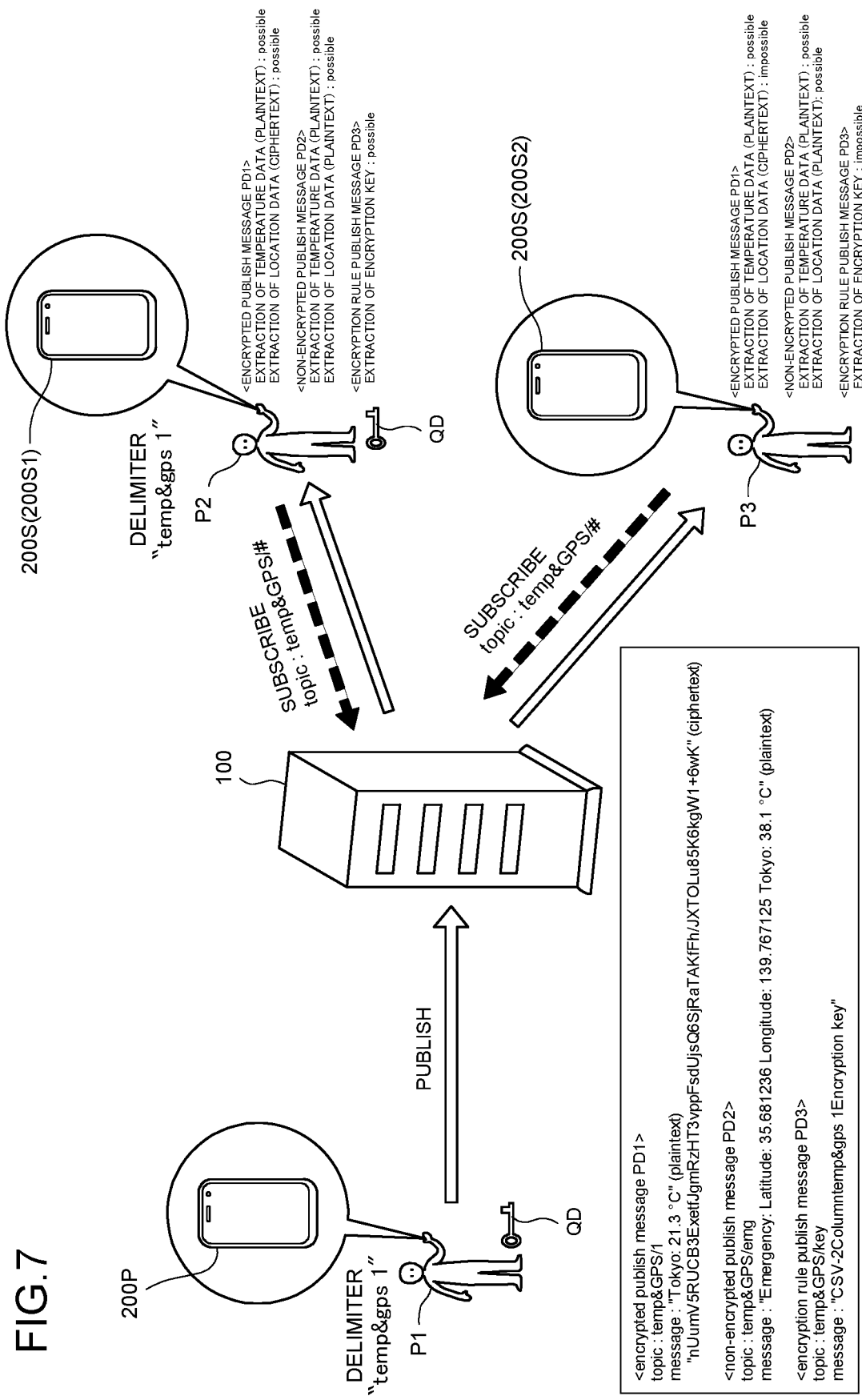

200S(200S1)

DELIMITER "temp&gps 1"

P2

QD

<ENCRYPTED PUBLISH MESSAGE PD1>
EXTRACTION OF TEMPERATURE DATA (PLAINTEXT) : possible
EXTRACTION OF LOCATION DATA (CIPHERTEXT) : possible <NON-ENCRYPTED PUBLISH MESSAGE PD2>
EXTRACTION OF TEMPERATURE DATA (PLAINTEXT) : possible
EXTRACTION OF LOCATION DATA (PLAINTEXT) : possible <ENCRYPTION RULE PUBLISH MESSAGE PD3>
EXTRACTION OF ENCRYPTION KEY : possible

200S(200S2)

P3

<ENCRYPTED PUBLISH MESSAGE PD1>
EXTRACTION OF TEMPERATURE DATA (PLAINTEXT) : possible
EXTRACTION OF LOCATION DATA (CIPHERTEXT) : impossible <NON-ENCRYPTED PUBLISH MESSAGE PD2>
EXTRACTION OF TEMPERATURE DATA (PLAINTEXT) : possible
EXTRACTION OF LOCATION DATA (PLAINTEXT) : possible <ENCRYPTION RULE PUBLISH MESSAGE PD3>
EXTRACTION OF ENCRYPTION KEY : impossible SUBSCRIBE
topic : temp&GPS|#

SUBSCRIBE
topic : temp&GPS/#

100

PUBLISH

200P

DELIMITER "temp&gps 1"

P1

QD

<encrypted publish message PD1>
topic : temp&GPS/1
message : "Tokyo: 21.3 °C" (plaintext)
"nUumV5RUCB3ExetfJgmRzHT3vppFsdUjsQ6SjRaTAKfFh/JXTOLu85K6KgW1+6wK" (ciphertext)

<non-encrypted publish message PD2>
topic : temp&GPS/emg
message : "Emergency: Latitude: 35.681236 Longitude: 139.767125 Tokyo: 38.1 °C" (plaintext)

<encryption rule publish message PD3>
topic : temp&GPS/key
message : "CSV-2Columntemp&gps 1Encryption key"

1

TERMINAL DEVICE, COMPUTER PROGRAM, COMMUNICATION SYSTEM, AND COMMUNICATION METHOD

TECHNICAL FIELD

The techniques disclosed herein relate to a communication technique based on a publish-subscribe message model.

BACKGROUND ART

As a method for performing communication between terminal devices, a publish-subscribe message model (hereinafter referred to as the "Pub/Sub model") is known (see, e.g., Patent Document 1). In the Pub/Sub-model, a terminal device functioning as a publisher (hereinafter referred to simply as "publisher") generates a publish message including topic designation data and message data, and transmits the publish message to a broker. The topic designation data is information for designating a topic to be managed in the broker. The broker registers the message data included in the received publish message to the topic designated by the topic designation data included in the publish message. The broker transmits the message data registered in the topic to a terminal device functioning as a subscriber (hereinafter referred to simply as "subscriber") requesting subscription to the topic in advance. Thus, the subscriber can subscribe to the message data corresponding to the previously requested topic among the message data distributed by the publisher.

CITATION LIST

Patent Literature

Patent Document 1: Japanese Unexamined Patent Application Publication No. 2018-13960

SUMMARY OF INVENTION

Technical Problem

In the Pub/Sub-model, there is a case where it is desired to ensure the confidentiality of message data between the publisher and the subscriber. Here, as a method for ensuring the confidentiality of the message data, there is, e.g., a method in which the publisher encrypts the entire publish message by a known encryption method (e.g., a standard encryption method by TLS (Transport Layer Security)) and transmits the encrypted message to the broker. However, this method requires the broker to decrypt the encrypted publish message in order to obtain the topic designation data. When decrypted, not only topic designation data of plaintext but also message data of plaintext are stored in the broker. Therefore, e.g., an external device accessible to the broker might be able to acquire this message data of plaintext thus threatening the confidentiality of the message data.

This specification discloses a technique capable of solving the above-described problems.

Solution to Problem

The techniques disclosed herein may be implemented in the following forms, for example.

(1) A terminal device discloses herein is a terminal device that performs communication with an external device through a broker on the basis of a publish-subscribe message model, including: an acquisition unit that acquires external data; an encryption processing unit that encrypts at least a part of the external data to generate cipher message data including ciphertext; and a data distribution unit that distributes an encrypted publish message including topic designation data of plaintext and the cipher message data to the broker. The present terminal device can distribute an encrypted publish message including topic designation data of plaintext and cipher message data obtained by encrypting at least a part of external data to a broker. Therefore, the broker registers the cipher message data in the designated topic without requiring the decryption of the cipher message data. Thus, the present terminal device can distribute the cipher message data to an external device while ensuring the confidentiality of the cipher message data.

(2) In the terminal device, the external data may include first external data and second external data, and the encryption processing unit may be configured to generate the cipher message data including the plaintext and the ciphertext by keeping the first external data in plaintext and encrypting the second external data. The present terminal device can distribute e.g., highly public first external data of plaintext and highly confidential second external data of ciphertext to an external device collectively as an encrypted publish message.

(3) In the terminal device, the external data may include first external data and second external data, and the encryption processing unit may be configured to generate the cipher message data by encrypting the first external data and the second external data by a method in which at least one of an encryption rule and an encryption key is different from each other. The present terminal device can distribute a plurality of external data encrypted by mutually different encryption methods to an external device collectively as an encrypted publish message.

(4) The terminal device may further include an encryption determination unit that determines whether the encryption condition is satisfied, wherein when the encryption determination unit determines that the encryption condition is satisfied, the encryption processing unit may generate the cipher message data, and the data distribution unit may distribute the encrypted publish message to the broker, and when the encryption determination unit determines that the encryption condition is not satisfied, the data distribution unit may distribute a non-encrypted publish message including topic designation data of plaintext and message data of plaintext to the broker. The present terminal device can distinguish between a confidential distribution mode in which a highly confidential (sensitive) encrypted publish message is distributed to a broker and a public distribution mode in which a highly public non-encrypted publish message is distributed to a broker on the basis of whether a predetermined encryption condition is satisfied. Thus, the present terminal device can implement a publish-subscribe message model in which confidentiality and openness of message data are ensured at the same time.

(5) The terminal device may further include a topic processing unit that makes pattern identification data for identifying the arrangement pattern (the placement pattern) of ciphertext in each of the encrypted publish message and the non-encrypted publish message be included in the topic designation data. The topic designation data of the encrypted publish message and the non-encrypted publish message distributed from the terminal includes pattern identification data. Therefore, on the basis of this pattern identification data, the external device can identify the arrangement pattern of the ciphertext in each of the encryption and non-encrypted publish messages. Thus, e.g., it is possible to make the external device correctly perform processing for a publish message in which the arrangement pattern of the ciphertext can be changed at any time without requiring a separate means for transmitting the pattern identification data to the external device.

(6) The terminal device may further include an encryption rule generation unit that generates encryption rule data including at least one of a decryption rule for decrypting the cipher message data and an encryption key, and the data distribution unit may distribute an encryption rule publish message including the topic designation data and the encryption rule data to the broker. The present terminal device can distribute at least one of an encryption rule and an encryption key generated on the terminal device side to an external device via communication based on a publish-subscribe message model. Thus, the encryption rule and the encryption key can be distributed to the external device without requiring another communication means while the encryption rule and the encryption key are determined on the terminal device side.

(7) In the terminal device, the encryption rule data may include the decryption rule, the encryption key, and a delimiter which is a delimiter separating the decryption rule and the encryption key and is a plurality of character strings. According to this terminal device, only the external device knowing the common delimiter in advance can acquire the encryption rule data from the encryption rule publish message received from the broker. This can enhance the confidentiality of the distribution of the encryption rule data to a specific external device.

(8) The terminal device may further include an encryption change determination unit that determines whether an encryption change condition is satisfied, and when the encryption change determination unit determines that the encryption change condition is satisfied, the encryption rule generation unit may generate new encryption rule data obtained by changing at least one of the decryption rule, the encryption key, and the delimiter. According to this terminal device, at least one of an encryption rule, an encryption key, and a delimiter is changed on the terminal device side. This effectively enhances the confidentiality of the distribution of the encryption rule data to a specific external device.

(9) In the terminal device, the encryption change determination unit may be configured to determine whether each of the first encryption change condition and the second encryption change condition that is more frequently satisfied than the first encryption change condition is satisfied, and the encryption rule generation unit may be configured to generate new first encryption rule data obtained by changing at least one of the decryption rule and the encryption key when the encryption change determination unit determines that the first encryption change condition is satisfied, and to generate new second encryption rule data obtained by changing the delimiter when the encryption change determination unit determines that the second encryption change condition is satisfied. According to the terminal device, since the frequency of changing the delimiter, which has a relatively small processing load accompanying the change, is higher than the frequency of changing the encryption rule or the encryption key, it is possible to suppress the processing load accompanying the change of the encryption rule data while enhancing the confidentiality of the distribution of the encryption rule data to a specific external device more effectively.

(10) A computer program disclosed herein causes a computer provided in a terminal device that performs communication with an external device through a broker on the basis of a publish-subscribe message model to execute: an acquisition process to acquire external data; an encryption process to encrypt at least a part of the external data to generate cipher message data including ciphertext; a data generation process to generate an encrypted publish message including topic designation data of plaintext and the cipher message data; and a data distribution process to distribute the encrypted publish message generated by the data generation process to the broker. The present computer program can distribute the cipher message data to an external device while ensuring confidentiality.

(11) A communication system disclosed herein includes a plurality of terminal devices and a broker, and performs communication on the basis of a publish-subscribe message model between the plurality of terminal devices through the broker, wherein at least one of the terminal devices includes: an acquisition unit that acquires external data; an encryption processing unit that encrypts at least a part of the external data to generate cipher message data including ciphertext; and a data distribution unit that distributes an encrypted publish message including topic designation data of plaintext and the cipher message data to the broker, and wherein at least another terminal device different from the one terminal device includes: a data subscription unit that subscribes to the encrypted publish message from the broker; and a decryption processing unit that decrypts the cipher message data included in the encrypted publish message. The present communication system can distribute cipher message data from one terminal device to another terminal device while securing the confidentiality of the cipher message data.

(12) A communication method disclosed herein is a communication method for performing communication on the basis of a publish-subscribe message model between a plurality of terminal devices through a broker, wherein at least one of the terminal devices conducts publishing process including: acquiring external data; encrypting at least a part of the external data to generate cipher message data including ciphertext; generating an encrypted publish message including topic designation data of plaintext and the cipher message data; and distributing the encrypted publish message generated by the data generation process to the broker, and wherein at least another terminal device different from the one terminal device conducts a subscribe process including: subscribing to the encrypted publish message from the broker; and decrypting the cipher message data included in the encrypted publish message. The present communication method can distribute cipher message data from one terminal device to another terminal device while securing the confidentiality of the cipher message data.

It should be noted that the techniques disclosed herein can be implemented in various forms, such as a terminal device (publisher/subscriber), a communication system including a broker and a plurality of terminal devices, a communication method, a computer program for implementing these methods, and a non-temporary recording medium on/in which the computer program is recorded.

BRIEF DESCRIPTION OF DRAWINGS

FIG. 3 is a block diagram schematically illustrating a configuration of a terminal device 200.

FIG. 7 is an explanatory diagram illustrating an example of the use of the communication system 10

DESCRIPTION OF EMBODIMENTS

A. Embodiment

Figure 1:
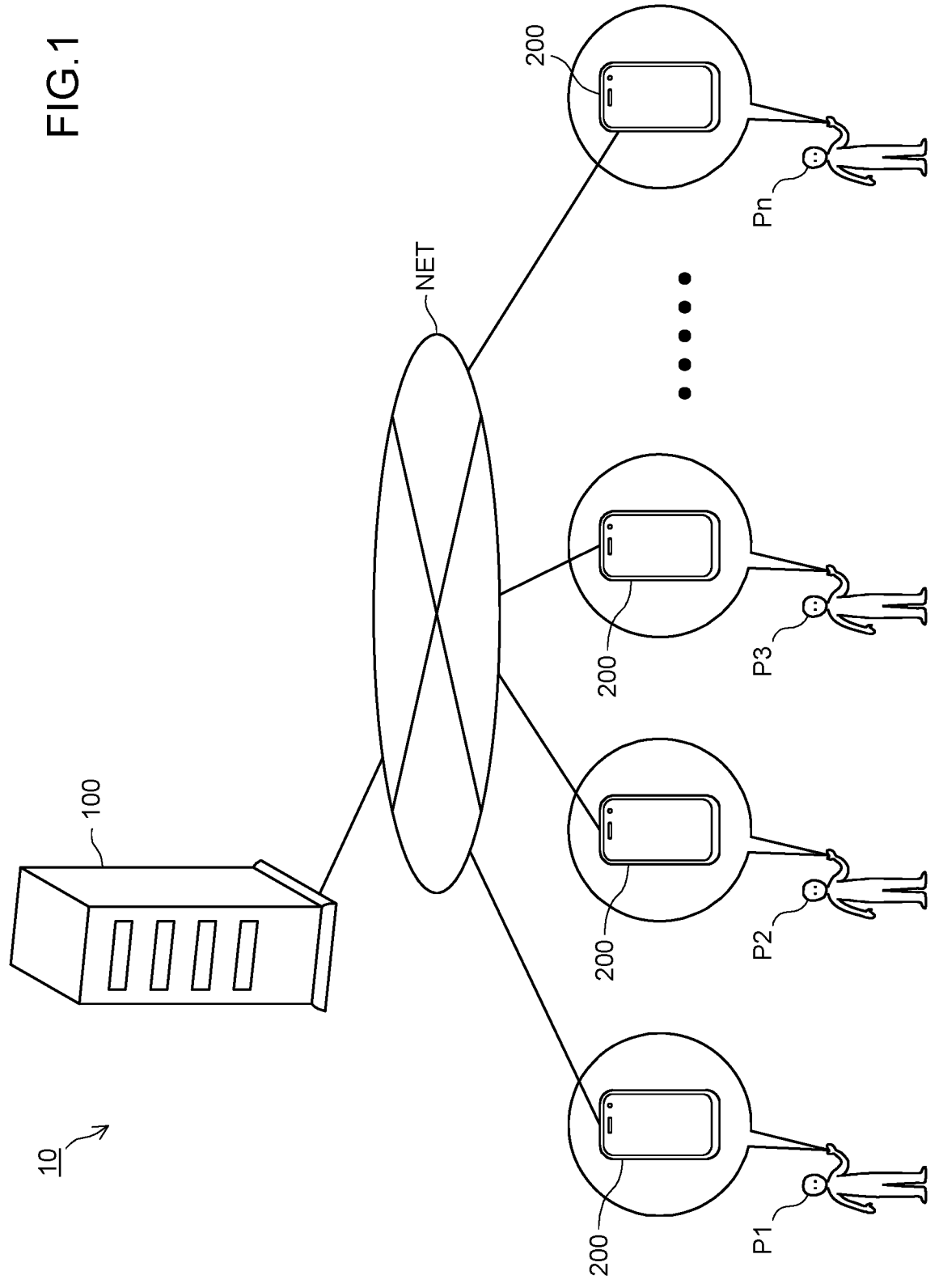
FIG. 1 is an explanatory diagram illustrating a schematic configuration of a communication system 10 according to the present embodiment.

A-1. Configuration of Communication System 10:

FIG. 1 is an explanatory diagram illustrating a schematic configuration of a communication system 10 according to the present embodiment. The communication system 10 is a system for performing communication among a plurality of terminal devices 200 by means of a Publish-Subscribe message model (hereinafter referred to as the "Pub/Sub model"). The communication system 10 includes a broker (also referred to as a "server") 100 and terminal devices 200 used by a plurality of users P (P1, P2, . . . , Pn). The devices constituting the communication system 10 are communicatively connected to each other via a communication network NET.

A broker 100 is a management device for receiving a request for publishing a message or subscribing to a message from each terminal device 200 in order to exchange a message among a plurality of terminal devices 200 in the Pub/Sub model. The broker 100 may implement protocols corresponding to the Pub/Sub-model, such as MQTT (MQ Telemetry Transport), AMQP (Advanced Message Queuing Protocol), OPC UA (OPC Unified Architecture), and the PubSub extension of XMPP (eXtensible Messaging and Presence Protocol) (XEP-0060).

Figure 2:
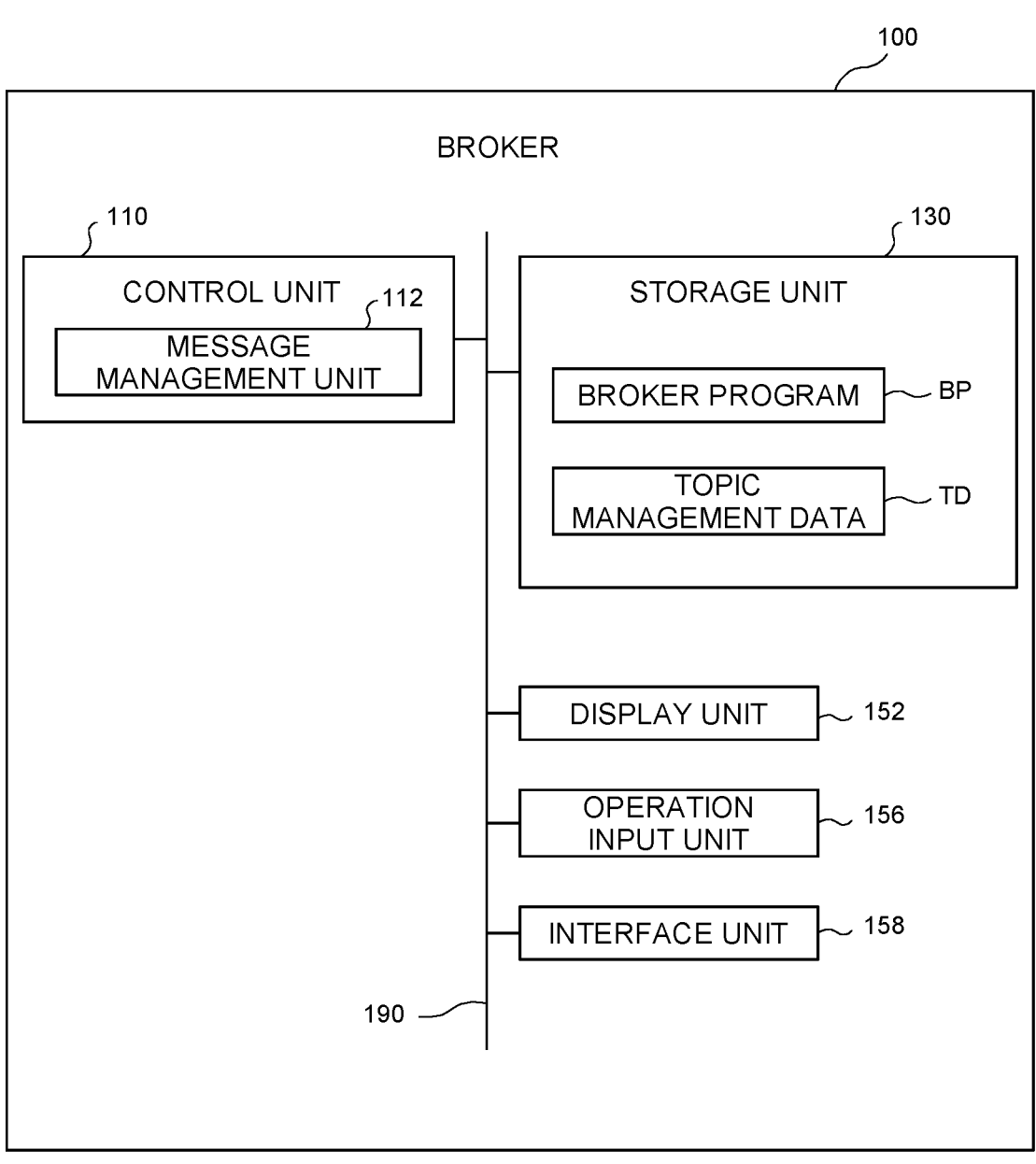
FIG. 2 is a block diagram schematically illustrating a configuration of a broker 100.

FIG. 2 is a block diagram schematically illustrating a configuration of the broker 100. The broker 100 includes a control unit 110, a storage unit 130, a display unit 152, an operation input unit 156, and an interface unit 158. These units are communicably connected to each other via a bus 190.

The display unit 152 of the broker 100 is composed of, e.g., a liquid crystal display or an organic EL display, and displays various images and information. The operation input unit 156 is composed of, e.g., a keyboard, a mouse, a button, and a microphone, among others, and receives an operation or an instruction from an operator. The interface unit 158 is configured by, e.g., a LAN interface or a USB interface, and communicates with other devices in a wired or wireless manner.

The storage unit 130 of the broker 100 is composed of, e.g., a ROM, a RAM, and a hard disk drive (HDD), and is used for storing various programs and data, and as a work area for executing various programs, and as a temporary storage area for data. For example, the storage unit 130 stores a broker program BP, which is a computer program for executing various processes related to the Pub/Sub-model. The broker program BP is provided in a state of being stored in a computer-readable recording medium (not shown) such as a CD-ROM, a DVD-ROM, or a USB memory, or is downloaded from an external device via a communication network NET, and is installed in the broker 100 to be stored in the storage unit 130.

The storage unit 130 of the broker 100 stores topic management data TD. The topic management data TD is a storage area for registering message data included in a publish message received from a terminal device 200 functioning as a publisher in association with a topic designated by topic designation data included in the publish message. The "topic" (also referred to as a "key" or "name") indicates a logical channel through which a message is distributed (published).

The control unit 110 of the broker 100 is configured by, e.g., a CPU and controls the operation of the broker 100 by executing a computer program retrieved from the storage unit 130. For example, the control unit 110 retrieves the broker program BP from the storage unit 130 and execute the broker program BP, thereby functioning as a message management unit 112 for executing various processes related to the Pub/Sub-model. This function will be described with reference to the description of the message management process to be described later.

The terminal device 200 is, e.g., a smartphone, a tablet type terminal, a personal computer (PC), a GPS (Global Positioning System) terminal, a wearable terminal, and a sensor, among other devices. FIG. 3 is a block diagram schematically illustrating a configuration of the terminal device 200. The terminal device 200 includes a control unit 210, a storage unit 230, a display unit 252, an acquisition unit 254, an operation input unit 256, and an interface unit 258. These units are communicably connected to each other via a bus 290.

The display unit 252 of the terminal device 200 is composed of, e.g., a liquid crystal display or an organic EL display, and displays various images and information. The operation input unit 256 is composed of, e.g., a keyboard, a mouse, a button, and a microphone, among others, and receives an operation or an instruction from a user P. The display unit 252 may be provided with a touch panel to function as the operation input unit 256. The interface unit 258 is configured by, e.g., a LAN interface or a USB interface, and communicates with other devices in a wired or wireless manner.

The acquisition unit 254 includes, e.g., a camera, a microphone, various sensors (temperature sensors, etc.), and a GPS receiving antenna, and acquires external data. The external data are, e.g., meteorological data such as temperature (environmental data), location (latitude and longitude) data, and detection data (emergency call data, abnormality detection data, biological data such as blood pressure and pulse, and the like) measured by sensors, measuring instruments, and the like. The operation input unit 256 may function as an acquisition unit. In this case, the external data is input information (e.g., personal information such as name and age) entered through the operation input unit 256.

The storage unit 230 of the terminal device 200 is composed of, e.g., a ROM, a RAM, and an HDD, and is used for storing various programs and data, and as a work area for executing various programs, and as a temporary storage area for data. For example, the storage unit 230 stores a publish program PP and a subscription program SP, which are application programs for executing various processes related to the Pub/Sub-model. The publish program PP and the subscription program SP are provided in a state of being stored in a computer-readable recording medium (not shown) such as a CD-ROM, a DVD-ROM, or a USB memory, or are downloaded from an external device via a communication network NET, and are installed in the terminal device 200 to be stored in the storage unit 230.

The control unit 210 of the terminal device 200 is configured by, e.g., a CPU and controls the operation of the terminal device 200 by executing a computer program retrieved from the storage unit 230. For example, the control unit 210 retrieves the publish program PP from the storage unit 230 and executes the publish program PP, thereby functioning as a publishing processing unit 212 for executing the publishing processing. In this case, the terminal device 200 functions as a publisher requesting the broker 100 to distribute (transmit) a message. Hereinafter, the terminal device 200 functioning as a publisher is specifically referred to as "publisher 200P". The publishing processing unit 212 includes a distribution condition determination unit 213, an encryption determination unit 214, an encryption processing unit 215, a topic processing unit 216, a data distribution unit 217, an encryption change determination unit 218, and an encryption rule generation unit 219. The functions of these units will be described with reference to the description of the publishing process to be described later. The terminal device 200 functioning as the publisher 200P is an example of the publisher in the claims.

The control unit 210 functions as a subscribe processing unit 222 for executing the subscribe process by retrieving the subscription program SP from the storage unit 230 and executing the subscription program SP. In this case, the terminal device 200 functions as a subscriber requesting the broker 100 to subscribe (receive) a message. Hereinafter, the terminal device 200 functioning as a subscriber is specifically referred to as "subscriber 200S". The subscribe processing unit 222 includes a subscription condition determination unit 223, a data sorting unit 224, an encryption acquisition unit 225, and a decryption processing unit 226. The functions of these units will be described with reference to the description of the subscribe process to be described later. The terminal device 200 functioning as the subscriber 200S is an example of the subscriber or the external device in the claims.

A-2. Processing Relating to Pub/Sub-Model:
A-2-1. Processing Performed by Broker 100:

The message management process executed by the broker 100 will be described. The message management process is a process for mediating message distribution and subscription between the publisher 200P and the subscriber 200S.

Upon receiving a publish message including topic designation data and message data from the publisher 200P, the message management unit 112 (FIG. 2) of the broker 100 registers the message data included in the received publish message to the topic designated by the topic designation data included in the publish message in the topic management data TD. In addition, the message management unit 112 transmits the message data registered in the topic to the subscriber 200S requesting the subscription to the topic in advance. Thus, the subscriber 200S can subscribe to only the message data corresponding to the previously requested topic among the message data distributed by the publisher 200P.

A-2-2. Processing Performed by Publisher 200P:
Publishing Process

Figure 4:
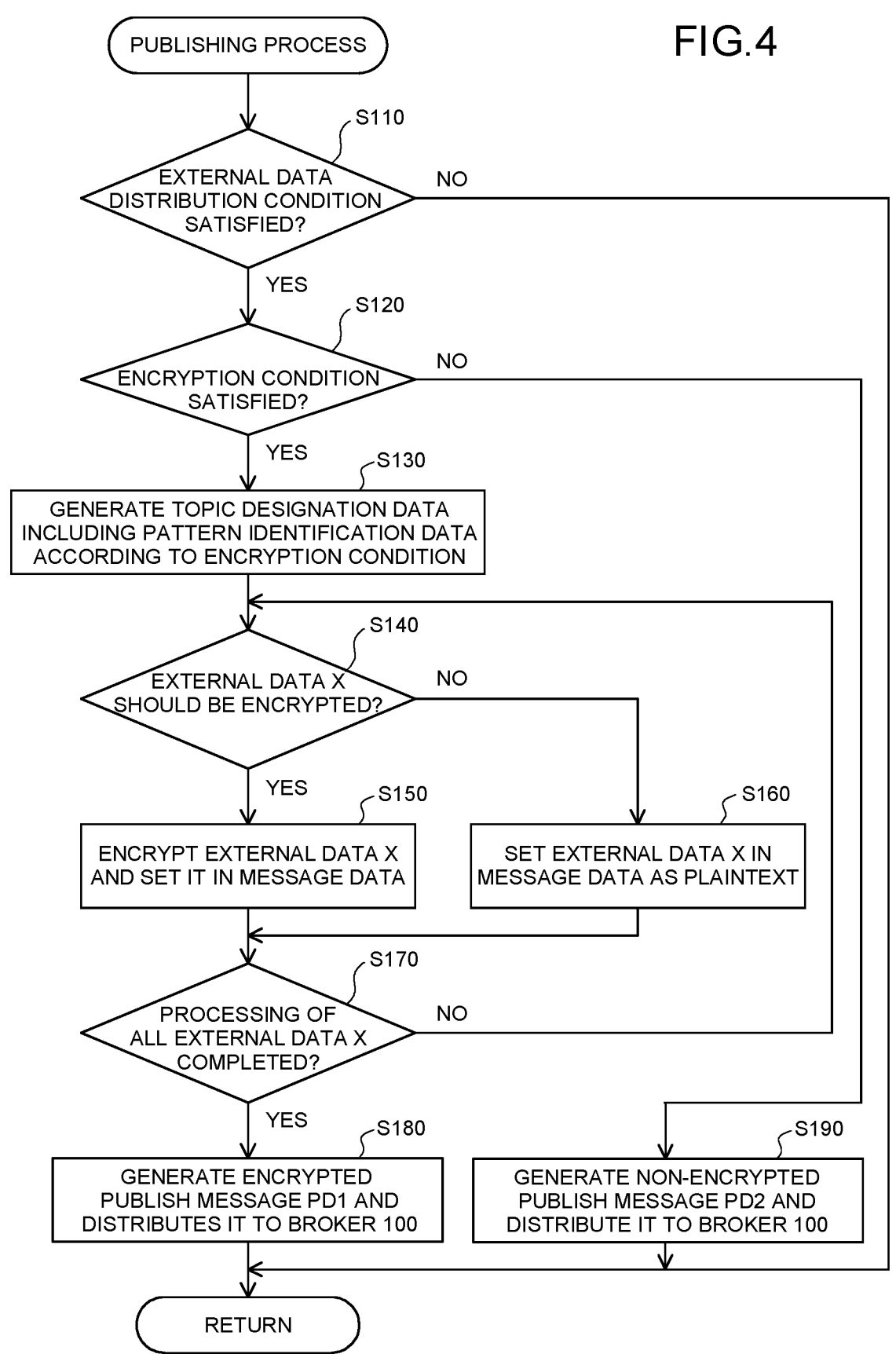
FIG. 4 is a flowchart illustrating contents of a publishing process.

The publishing process executed by the publisher 200P will be described. The publishing process is a process of distributing a publish message (encrypted publish message PD1 and non-encrypted publish message PD2 described later) including external data to the broker 100 as a message distribution request. FIG. 4 is a flowchart illustrating the contents of the publishing process. For example, when the power of the terminal device 200 is turned on, the terminal device 200 and the broker 100 are communicatively connected to automatically start the publishing process, and the publishing process is always executed while the power of the terminal device 200 is turned on. The publishing process may be manually started by a specific user Px tapping a publishing icon (not shown) arranged on a screen displayed on the display unit 252 of the terminal device 200.

It is assumed that encryption information QD and a delimiter WD are previously stored in the storage unit 230. The encryption information QD includes a decryption rule and an encryption key (also referred to as a "private key"). The delimiter WD is one or more character strings, and may be, e.g., a combination of at least two of alphabets, numbers, and symbols. The method for storing the initial values of the encryption information QD and the delimiter WD in the storage unit 230 may be as follows: the encryption information QD may be transmitted from an external device to the terminal device 200 via a communication means such as mail, Bluetooth (registered trade mark), or peer-to-peer, and stored in the storage unit 230; or the encryption information QD may be input to the terminal device 200 via an input operation by a user P, data read from an external memory, or QR code (registered trademark) or barcode reading, and stored in the storage unit 230.

As shown in FIG. 4, the distribution condition determination unit 213 (FIG. 3) of the publisher 200P determines whether the external data distribution condition is satisfied (S110). The distribution condition is a condition for distributing the external data, and may be, e.g., a repetition timing of a predetermined period or a predetermined time limit, a timing when the acquisition unit 254 acquires the external data, or a timing when the external data acquired by the acquisition unit 254 changes. The acquisition unit 254 can acquire a plurality of types of external data at the same time or at different times. Hereinafter, a case where the acquisition unit 254 acquires a plurality of types of external data at the same time will be described by way of example. The process by the acquisition unit 254 to acquire external data is an example of the acquisition process in the claims.

When the distribution condition determination unit 213 determines that the distribution condition is satisfied (S110: YES), the encryption determination unit 214 (FIG. 3) determines whether the encryption condition is satisfied for each of the acquired plurality of types of external data (S120). The encryption condition is a condition for encrypting at least a part of the external data to be acquired by the acquisition unit 254, and may be, e.g., a repetition timing of a predetermined cycle or an arrival of a predetermined time limit, a fact that the external data to be acquired by the acquisition unit 254 has changed (e.g., it comes to contain or not contain abnormal or urgent information), or a fact that the external data has a relatively high confidentiality (e.g., personal information and trade secret information). The encryption conditions are individually set for each of the plurality of types of external data. The encryption determination unit 214 determines that the encryption condition is satisfied when at least one type of external data satisfying the encryption condition exists among the plurality of types of external data. The plurality of types of external data may include external data which are always not encrypted without satisfying encryption conditions (e.g., external data having low confidentiality and being more public).

When the encryption determination unit 214 determines that the encryption condition is satisfied (S120: YES), the topic processing unit 216 (FIG. 3) generates topic designation data including pattern identification data according to the encryption condition (S130). The topic designation data generated here includes topic identification data and pattern identification data. The topic identification data is data indicating a topic name managed by the broker 100.

The pattern identification data is data for identifying the arrangement pattern (the placement pattern) of the ciphertext in the publish message (encrypted publish message PD1, non-encrypted publish message PD2) in the subscriber 200S. The arrangement pattern is a pattern corresponding to the presence or absence of the ciphertext in the message data and the position of the ciphertext in the message data. For example, when the message data is a data string in which a plurality of types of external data are delimited by a delimiter (e.g., a comma), the arrangement pattern includes a whole plaintext pattern in which all of the plurality of types of external data are plaintext, and a ciphertext pattern including at least one type of external data that is a ciphertext. The plaintext is data that can be interpreted by a computer (broker 100 or terminal device 200) without decryption. This ciphertext pattern includes a plurality of patterns corresponding to positions of the ciphertext in the message data.

For example, when the message data includes the first external data and the second external data in this order, the arrangement pattern includes:

whole plaintext pattern: "first external data (plaintext), second external data (plaintext)";
  first half ciphertext pattern: "first external data (ciphertext), second external data (plaintext)";
  second half ciphertext pattern: "first external data (plaintext), second external data (ciphertext)"; and
  whole ciphertext pattern: "first external data (ciphertext), second external data (ciphertext)".

When encrypting a plurality of types of external data (first external data, second external data), the encryption processing unit 215 may generate cipher message data by encrypting each of the plurality of types of external data by a method in which at least one of an encryption rule and an encryption key is different from each other.

Next, the encryption processing unit 215 (FIG. 3) encrypts the external data to be encrypted among the plurality of types of external data to generate cipher message data (S140 to S170). The cipher message data is a data string including a ciphertext in which at least one of a plurality of types of external data is encrypted. For example, when the plurality of types of external data are the first external data and the second external data, the cipher message data is a message data of one of the first half ciphertext pattern, the second half ciphertext pattern, and the whole ciphertext pattern.

Specifically, the encryption processing unit 215 sequentially performs the following processing for each of the plurality of types of external data. First, the encryption processing unit 215 determines whether the external data X should be encrypted (S140). The external data X means each of a plurality of types of external data. The encryption processing unit 215 determines the necessity of encryption of the external data X on the basis of the result of the encryption determination by the encryption determination unit 214 in S120. When determining that encryption of the external data X is necessary (S140: YES), the encryption processing unit 215 retrieves the latest encryption information QD corresponding to the external data X from the storage unit 230, encrypts the external data X on the basis of the encryption information QD, and sets the encrypted external data X in the message data (S150). As will be described later, the latest encryption information QD is also known by the subscriber 200S registered in the topic. That is, this external data X is encrypted by encryption processing that can be decrypted by the subscriber 200S registered in the above topic. The processing in S150 is an example of the encryption process in the claims.

When determining that the encryption of the external data X is unnecessary (S140: NO), the encryption processing unit 215 set the external data X in the message data as plaintext without encryption (S160). When unprocessed external data X remains (S170: NO), the encryption processing unit 215 returns to S140 and executes the processing after S140 with respect to the external data X of the next order. When the processing of all the external data X is completed (S170: YES), the data distribution unit 217 generates an encrypted publish message PD1 and distributes the encrypted publish message PD1 to the broker 100 (S180). The encrypted publish message PD1 is distribution data including the topic designation data of plaintext and cipher message data. After distribution of the encrypted publish message PD1, the control unit 210 of the publisher 200P returns to the processing of S110 and enters a standby state. The processing in S180 is an example of the data generation process and the data distribution process in the claims.

When the encryption determination unit 214 determines that the encryption condition is not satisfied (S120: N), a non-encrypted publish message PD2 is generated and distributed to the broker 100 (S190). That is, the message data of the whole plaintext pattern described above are generated in which the plurality of types of external data are not encrypted and set as plaintext. In other words, the non-encrypted publish message PD2 is distribution data including topic designation data of plaintext and message data of plaintext. After the non-encrypted publish message PD2 is distributed, the control unit 210 of the publisher 200P returns to the processing of S110 and enters a standby state. When the distribution condition determination unit 213 determines in S110 that the distribution condition is not satisfied (S110: NO), the process enters a standby state in S110.

Encryption Change Process

Figure 5:
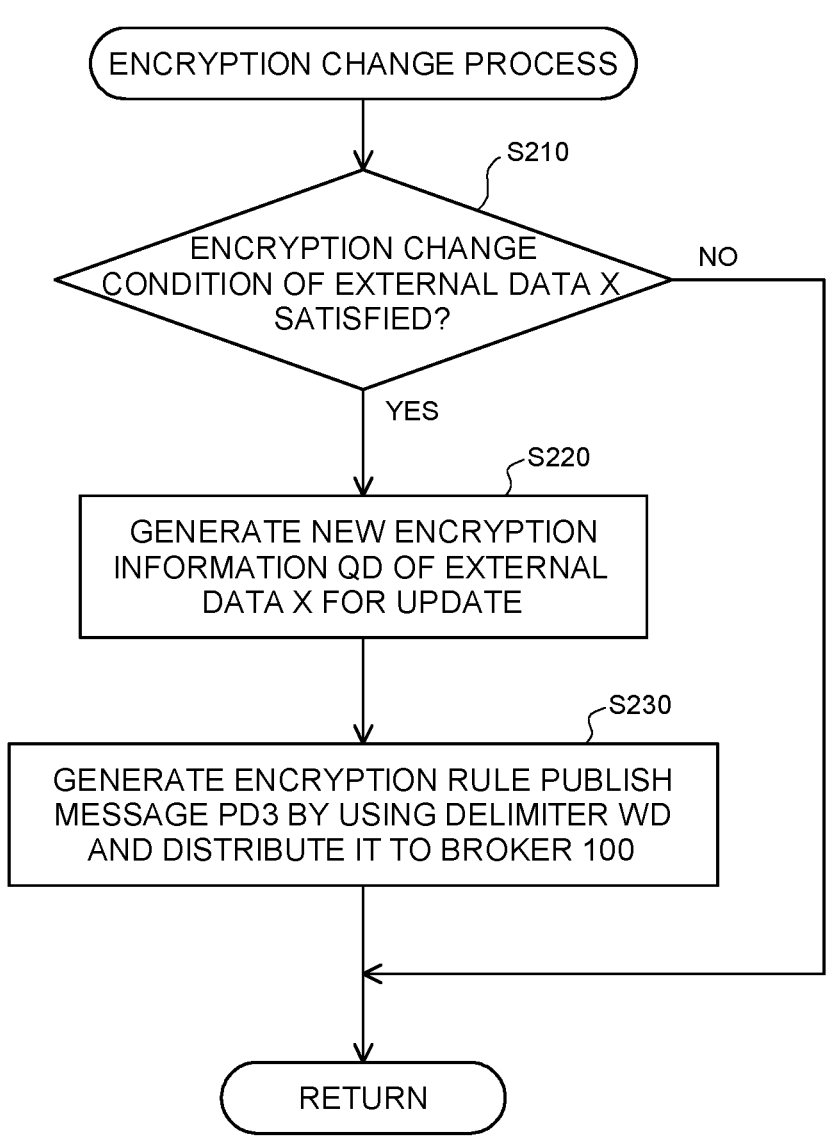
FIG. 5 is a flowchart illustrating contents of an encryption change process.

The encryption change process executed by the publisher 200P will be described. The encryption change process is a process for appropriately changing the encryption information QD for decrypting the cipher message data included in the encrypted publish message PD1 by the subscriber 200S in order to enhance the confidentiality of the encrypted publish message PD1. FIG. 5 is a flowchart illustrating the contents of the encryption change process.

As shown in FIG. 5, the encryption change determination unit 218 (FIG. 3) of the publisher 200P determines whether the encryption change condition of the external data X is satisfied (S210). The encryption change condition is a condition for changing at least a part of the encryption information QD used for encrypting and decrypting the external data for each of the plurality of types of external data X. The encryption change condition may be, e.g., that a predetermined operation has been performed by a user P, that the number of times of encryption processing of external data has reached a predetermined number of times, or that a repetition timing of a predetermined cycle or a predetermined time limit has arrived.

When the encryption change determination unit 218 determines that the encryption change condition is satisfied (S210: YES), the encryption rule generation unit 219 (FIG. 3) generates the latest encryption rule data of the external data X. The encryption rule data is information including encryption information QD and a delimiter WD. The encryption rule generation unit 219 generates new encryption information QD of the external data X according to a predetermined algorithm to update the contents stored in the storage unit 230 (S220). In the new encryption information QD, at least one of a decryption rule and an encryption key is different from the encryption information QD already stored in the storage unit 230.

Here, the encryption change determination unit 218 determines whether the delimiter change condition of the external data X is satisfied, independently from S210 in FIG. 5, and when it is determined that the delimiter change condition is satisfied, generates a new delimiter WD of the external data X according to a predetermined algorithm to update the contents stored in the storage unit 230. The delimiter change condition is a condition for changing the delimiter WD stored in the storage unit 230, and is a condition that will be satisfied more frequently than the above encryption change condition in S210. The delimiter change condition may be, e.g., that the number of times of encryption processing of the external data X has reached a predetermined number less than that of the encryption change condition, or that the repetition timing of a cycle shorter than that of the encryption change condition or a predetermined time limit has arrived. In the present embodiment, e.g., the delimiter WD may be changed every predetermined time (e.g., about every five minutes) in a short period of time by using a one-time password (a time stamp method or a challenge response method may be used).

Therefore, the encryption rule data generated by the encryption rule generation unit 219 is information including the latest encryption information QD and the latest delimiter WD, and the delimiter WD is changed at any time at a higher frequency than the encryption information QD. The encryption change condition in S210 is an example of the first encryption change condition in the claims, and the delimiter change condition is an example of the second encryption change condition in the claims.

Next, the data distribution unit 217 generates an encryption rule publish message PD3 of the external data X from the latest encryption rule data of the external data X, and distributes the encryption rule publish message PD3 to the broker 100 (S230). The encryption rule publish message PD3 is a data string for distribution including topic designation data of plaintext and encryption rule data of plaintext. The topic designation data of plaintext includes encryption rule notification data indicating the presence or absence of the notification of the encryption rule in addition to the topic identification data. The encryption rule data is a data string (message data) in which a decryption rule of plaintext and an encryption key of plaintext are delimited by the delimiter WD of plaintext and arranged in this order. It should be noted that the order of the decryption rule and the encryption key may be mutually exchanged. After the distribution of the encryption rule publish message PD3, the control unit 210 of the publisher 200P returns to the processing of S210 and enters a standby state. When the encryption change determination unit 218 determines in S210 that the encryption change condition is not satisfied (S210: NO), the process also enters a standby state in S210.

Figure 6:
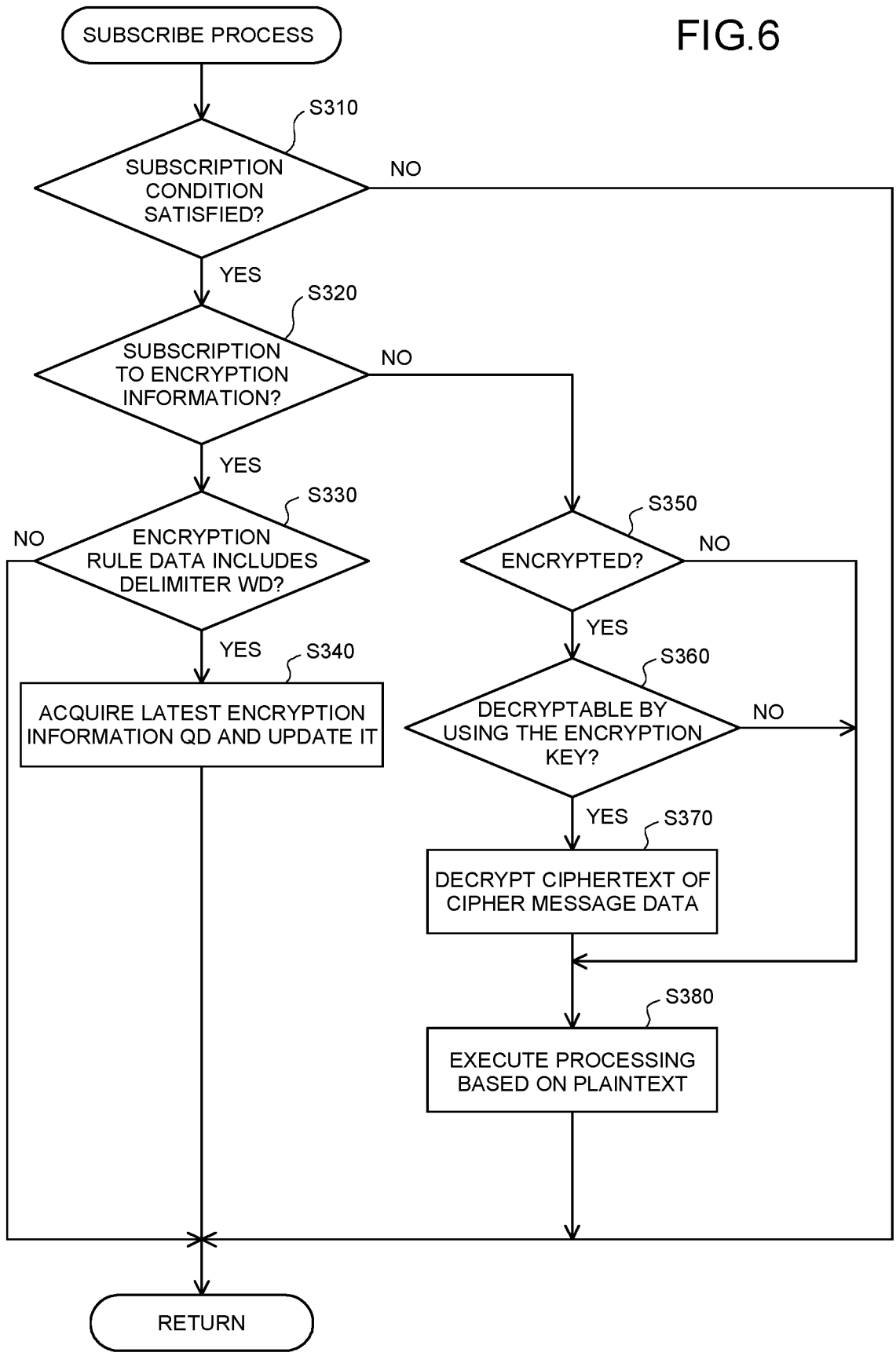
FIG. 6 is a flowchart illustrating contents of a subscribe process.

A-2-3. Processing Performed by Subscriber 200S:

The subscribe process performed by the subscriber 200S will be described. The subscribe process is a process for subscribing a publish message (publish messages PD1, PD2 including external data, encryption rule publish message PD3) to the broker 100 as a message subscribe request. FIG. 6 is a flowchart illustrating the contents of the subscribe process. For example, when the power of the terminal device 200 is turned on, the subscribe process is automatically started by communicatively connecting the terminal device 200 and the broker 100, and is repeatedly executed at predetermined time intervals while the power of the terminal device 200 is turned on. In should be noted the subscribe process may be manually started by a specific user Px tapping a subscribing icon (not shown) arranged on the screen displayed on the display unit 252 of the terminal device 200.

As shown in FIG. 6, the subscription condition determination unit 223 (FIG. 3) of the subscriber 200S determines whether the subscription condition of the topic registered by the broker 100 is satisfied (S310). The subscription condition is a condition for subscribing (receiving) a publish message corresponding to a topic, and may be, e.g., a repetition timing of a predetermined cycle or arrival of a predetermined time limit.

When the subscription condition determination unit 223 determines that the subscription condition is satisfied (S310: YES), the data sorting unit 224 (FIG. 3) subscribes (receives) a publish message (one of PD1 to PD3) registered in the topic, and determines whether this subscription is a subscription to the encryption information QD (S320). In this case, the data sorting unit 224 is an example of the data subscription unit in the claims. The data sorting unit 224 determines this subscription to be a subscription to encryption information QD (encryption rule publish message PD3) if the topic designation data included in the publish message includes the encryption rule notification data, and to be a subscription to external data (encrypted publish message PD1 or non-encrypted publish message PD2) if the topic designation data does not include the encryption rule notification data.

When the data sorting unit 224 determines the subscription to be a subscription to encryption information (S320: YES), the encryption acquisition unit 225 determines whether the encryption rule data includes a delimiter matching the delimiter WD currently stored in the storage unit 230 (S330). When determining that the matching delimiter is included in the encryption rule data (S330: YES), the encryption acquisition unit 225 can extract the decryption rule and the encryption key delimited by the delimiter WD. Then, the encryption acquisition unit 225 (FIG. 3) acquires the latest encryption information QD from the encryption rule data, stores and updates the encryption information QD in the storage unit 230 (S340), and returns to S310. Thus, the subscriber 200S can decrypt the cipher message data encrypted based on the encryption information QD that is changed at any time by the publisher 200P.

When determining that the matching delimiter is not included in the encryption rule data (S330: NO), the encryption acquisition unit 225 cannot acquire the latest encryption information QD from the encryption rule data and returns to S310 without updating the encryption information QD stored in the storage unit 230. Thus, for the plurality of subscribers 200S registered in the common topic, by making the latest delimiter WD known by each of them different from each other, the encryption rule data can be individually changed at different timings.

When the data sorting unit 224 determines that the subscription is not a subscription to encryption information (S320: NO), the decryption processing unit 226 (FIG. 3) determines whether the message data is encrypted, i.e., whether the message data is cipher message data (S350). The decryption processing unit 226 determines that the message data is encrypted when the pattern identification data included in the topic designation data of the publish message indicates the ciphertext pattern, and determines that the message data is not encrypted when the pattern identification data indicates the whole plaintext pattern.

When the data sorting unit 224 determines that the message data is encrypted (S350: YES), the decryption processing unit 226 determines whether the ciphertext included in the cipher message data can be decrypted by using the encryption information QD currently stored in the storage unit 230 (S360). The decryption processing unit 226 can grasp the arrangement of ciphertext in the cipher message data on the basis of the pattern identification data. When determining that decryption is possible (S360: YES), the decryption processing unit 226 decrypts the ciphertext included in the cipher message data in accordance with the encryption information QD (S370). Thus, all of the plurality of types of external data included in the cipher message data are acquired in plaintext. Next, the control unit 210 of the subscriber 200S executes processing based on the message data of plaintext (S380) and returns to S310.

When the decryption processing unit 226 determines that decryption is not possible (S360: NO), the control unit 210 of the subscriber 200S acquires only the plaintext included in the cipher message data, executes processing based on the plaintext (S380), and returns to S310.

When the data sorting unit 224 determines that the message data is not cipher message data (S350: NO), the control unit 210 of the subscriber 200S executes processing based on the plaintext included in the message data (S380), and returns to S310. When the subscription condition determination unit 223 determines in S310 that the subscription condition is not satisfied (S310: NO), the process enters a standby state.

A-3. Example

Next, an example of the use of the above-described communication system 10 will be described. FIG. 7 is an explanatory diagram illustrating an example of the use of the communication system 10. As shown in FIG. 7, the following situation is assumed in this description. The communication system 10 includes one publisher 200P and two subscribers 200S. Two types of external data, i.e., temperature data and location data, are used. The common encryption information QD and the delimiter WD ("temp&gps 1") are stored in the respective storage units 230 of the publisher 200P and the first subscriber 200S1. On the other hand, the common encryption information QD and the delimiter WD are not stored in the storage unit 230 of the second subscriber 200S2.

A-3-1. Distribution and Subscription of Encrypted Publish Message PD1:

The distribution and subscription of the encrypted publish message PD1 will be described. FIG. 7 illustrates an encrypted publish message PD1 having the following contents.

Topic (topic designation data): "temp&GPS/1"

Note that "/1" is pattern identification data indicating the second half ciphertext pattern.

Message (message data): "Tokyo: 21.3° C., nUumV5RUCB3ExetfJgmRzHT3vppFsdUjsQ6SjRa TAKfFh/JXTOLu85K6kgW1+6 wK"

The character string before "," is the plaintext of the temperature data, and the character string after "," is the ciphertext obtained by encrypting the location data (latitude: 35.681236 longitude: 139.767125) with an encryption key ("Encryption key") described later.

For example, in the publishing process (FIG. 4) at the publisher 200P, when the encryption condition of the temperature data is not satisfied and the encryption condition of the location data is satisfied, it is determined in S120 that the encryption condition is satisfied (S120: YES). Here, since the temperature data is highly public and should be opened, the encryption condition of the temperature data is always unsatisfied. On the other hand, since the location data is personal information specifying the location of a user P1 who owns the publisher 200P, and the confidentiality should be emphasized, the encryption condition of the location data is, e.g., that the external data acquired by the acquisition unit 254 is data indicating a normal state. The normal state is, e.g., a state in which the temperature data is within a normal range (e.g., a predetermined upper limit temperature or less and a predetermined lower limit temperature or more). The encryption condition of the location data may be that the location of the location data is outside a predetermined prohibited area.

Next, the publisher 200P creates topic designation data ("temp&GPS/1") including pattern identification data "/1" indicating the second half ciphertext pattern (S130). The temperature data of the plaintext ("Tokyo: 21.3° C.") and the location data of the ciphertext ("nUumV5RUCB3Exet100J gmRzHT3vppFsdUjsQ6SjRaTAKPD1Fh/JXTOLu85K6k gW1+6wK") are set in the message data (S150 and S160), and the encrypted publish message PD1 is generated and distributed to the broker 100 (S180).

In both the first subscriber 200S1 and the second subscriber 200S2, when the subscription condition is satisfied (S310: YES) in the subscribe process (FIG. 6), the encrypted publish message PD1 is subscribed from the broker 100. Since the topic designation data of the encrypted publish message PD1 includes pattern identification data ("/1") indicating a second half ciphertext pattern, it is determined that the subscription is not a subscription of the encryption information (S320: NO), and it is determined that the message data is encrypted (S350: YES).

The encryption information QD common to the publisher 200P is stored in the storage unit 230 of the first subscriber 200S1. Therefore, the location data of the ciphertext in the message data is decrypted (S360: YES, S370). That is, the first subscriber 200S1 can acquire external data of both the temperature data and the location data as plaintext, and executes processing based on the temperature data and the location data (S380). For example, information indicating the temperature acquired by the publisher 200P and the location of the publisher 200P is displayed on the display unit 252 of the first subscriber 200S1. Thus, a user P2 owning the first subscriber 200S1 can know both the ambient temperature and the location of the user P1.

On the other hand, the encryption information QD common to the publisher 200P is not stored in the storage unit 230 of the second subscriber 200S2. The location data of the ciphertext in the message data is not decrypted (S360: NO). That is, in the second subscriber 200S2, only the temperature data can be acquired as plaintext, and processing based on this temperature data is executed (S380). For example, information on the temperature acquired by the publisher 200P is displayed on the display unit 252 of the second subscriber 200S2. Thus, a user P3 owning the second subscriber 200S2 can know the ambient temperature of the user P1 but cannot know the location of the user P1.

As described above, with the distribution of and subscription to the encrypted publish message PD1, highly public data (temperature data) can be acquired by all the subscribers 200S (200S1, 200S2) registered in the topic ("temp&GPS/#"), while highly confidential data (location data) can be acquired only by some of the subscribers 200S (200S1).

A-3-2. Non-Encrypted Publish Message PD2 Distribution and Subscription:

The distribution and subscription of the non-encrypted publish message PD2 will be described. FIG. 7 illustrates a non-encrypted publish message PD2 having the following contents.

Topic (topic designation data): "temp&GPS/emg"

Note that "/emg" means "emergency" and is pattern identification data indicating the whole plaintext pattern.

Message (message data): "Emergency: Latitude: 35.681236 Longitude: 139.767125 Tokyo: 38.1° C."

All message data are in plaintext.

For example, in the publisher 200P, when the acquisition unit 254 acquires temperature data indicating 38.1° C. exceeding the normal temperature range, not only the encryption condition of the temperature data but also the encryption condition of the location data are not satisfied. Then, in the publishing process (FIG. 4), it is determined that the encryption condition is not satisfied (S120: NO).

Next, the publisher 200P creates topic designation data ("temp&GPS/emg") including pattern identification data "/emg" indicating the whole plaintext pattern, generates the non-encrypted publish message PD2, and distribute the non-encrypted publish message PD2 to the broker 100 (S190).

In both the first subscriber 200S1 and the second subscriber 200S2, when the subscription condition is satisfied (S310: YES) in the subscribe process (FIG. 6), the non-encrypted publish message PD2 is subscribed from the broker 100. Since the topic designation data of the non-encrypted publish message PD2 includes pattern identification data ("/emg") indicating the whole plaintext pattern, it is determined that the subscription is not a subscription to the encryption information (S320: NO), and it is determined that the message data is not encrypted (S350: NO).

As a result, both of the first subscriber 200S1 and the second subscriber 200S2 can acquire the external data of the temperature data and the location data as plaintext, and executes processing based on the temperature data and the location data (S380). For example, information indicating the emergency, the temperature acquired by the publisher 200P, and the location of the publisher 200P are displayed on the display unit 252 of the first subscriber 200S1 and the second subscriber 200S2. Thus, not only the user P2 who owns the first subscriber 200S1 but also the user P3 who owns the second subscriber 200S2 can know both the ambient temperature and the location of the user P1.

As described above, with the distribution of and subscription to the encrypted publish message PD1 and the non-encrypted publish message PD2, it is possible to switch between a public distribution mode in which highly confidential data (location data) is distributed to all the subscribers 200S (200S1, 200S2) registered in the topic ("temp&GPS/#") and a confidential distribution mode in which highly confidential data (location data) is distributed to only some of the subscribers 200S (200S1) on the basis of the encryption condition.

A-3-3. Distribution and Subscription of Encryption Rule Publish Message PD3:

The distribution and subscription of the encryption rule publish message PD3 will be described. FIG. 7 illustrates an encryption rule publish message PD3 having the following contents.

Topic (topic designation data): "temp&GPS/key"

Note that "/key" is encryption rule notification data which means notification of an encryption rule.

Message (message data): "CSV-2Columntemp&gps 1Encryption key"

Note that the character string before the delimiter ("temp&gps1") is the plaintext of the decryption (encryption) rule, and the character string after the delimiter ("temp&gps1") is the plaintext of the encryption key. "CSV-2Column" means a rule that column 2 of message data should be decrypted.

For example, in the encryption change process (FIG. 5) at the publisher 200P, when it is determined that the encryption change condition of the location data is satisfied (S210: YES), new encryption information QD is generated and stored in the storage unit 230 (S220). The above encryption rule publish message PD3 in which the new encryption information QD is delimited by the delimiter character ("temp&gps 1") is delivered to the broker 100 (S230).

Since the common delimiter WD ("temp&gps 1") is stored in the first subscriber 200S1 registered in the topic ("temp&GPS/#"), the first subscriber 200S1 can specify the common delimiter WD in the encryption rule data of the subscribed encryption rule publish message PD3, and acquire the latest encryption information QD (decryption rule and encryption key). On the other hand, since the common delimiter WD is not stored in the second subscriber 200S2 registered in the topic ("temp&GPS/#"), the second subscriber 200S2 cannot acquire the encryption information QD from the encryption rule data of the subscribed encryption rule publish message PD3. That is, the encryption information QD that is changed on the publisher 200P side at any time can be subscribed only by the specific subscriber 200S (200S1) by the Pub/Sub model while ensuring confidentiality. Moreover, the publisher 200P and the first subscriber 200S1 sequentially change the common delimiter character in synchronization with the time by, e.g., a one-time password. Therefore, the confidentiality of the encryption information QD can be further enhanced.

A-4. Usage Example

The communication system 10 of this embodiment can be used in the following modes, for example.

Conditional Open Mode

In the conditional open mode, when a predetermined open condition is not satisfied, the publisher 200P distributes the highly confidential encrypted publish message PD1, and when the predetermined open condition is satisfied, the publisher 200P distributes the highly public non-encrypted publish message PD2.

The conditional open mode can be used, e.g., in the following applications.

User P1 of the publisher 200P: protectee (e.g., children and the elderly, and those requiring care)

User P2 of the first subscriber 200S1: protector (e.g., family or relatives of the protectee)

User P3 of second subscriber 200S2: non-protector (e.g., subscribers registered in the topic, residents in the vicinity)

Predetermined open condition: occurrence of an emergency

The encrypted publish message PD1: a message including a ciphertext of highly confidential external data (e.g., personal data such as body data including body temperature, pulse, and sweating, and location data of the person) and a plaintext of highly public data (e.g., data having high public nature such as weather data including temperature).

Examples of emergency situations may include pressing of an emergency button of the publisher 200P and acquisition of external data (e.g., weather data, body data, and location data) indicating a value outside the predetermined normal range by the publisher 200P.

When the open condition is not satisfied, the highly confidential encrypted publish message PD1 is distributed from the publisher 200P. As a result, the highly confidential external data is acquired by the protector (P2) but not by the non-protector (P3), and the confidentiality of the highly confidential external data is secured. On the other hand, the highly public external data is acquired not only by the protector (P2) but also by the non-protector (P3). By widely distributing highly public external data in this way, it is possible to improve services for subscribers in the conditional open mode and to acquire and utilize big data.

When the open condition is satisfied, a non-encrypted publish message PD2 is distributed from the publisher 200P. As a result, highly confidential external data is acquired not only by the protector (P2) but also by the non-protector (P3). Thus, e.g., the non-protector (P3) who has found the protectee (P1) can take appropriate action on the basis of the highly confidential external data.

Location Transmission Mode

The location transmission mode is a mode in which the publisher 200P distributes the encrypted publish message PD1 including plaintext of the individual location data.

The location transmission mode can be used in the following applications, for example.

User P1 of publisher 200P: attention target person (e.g., children and the elderly, those requiring care, and persons infected with a virus)

User P2 of first subscriber 200S1: relevant person (e.g., family or relative of the attention target person)

User P3 of second subscriber 200S2: non-relevant person (e.g., subscribers registered in the topic, drivers of vehicles, bicycles, motorcycles, and the like, and residents in the vicinity)

The encrypted publish message PD1 includes a ciphertext of highly confidential external data (e.g., personal data capable of specifying the attention target person (P1)), and a plaintext of location data for specifying the location of the attention target person (P1).

The encrypted publish message PD1 including the plaintext of the location data is distributed from the publisher 200P. As a result, the location data of the attention target person (P1) is acquired not only by the relevant person (P2) but also by the non-relevant person (P3). However, the personal data of the attention target person (P1) is acquired by the relevant person (P2), but not by the non-relevant person (P3). That is, the relevant person (P2) can always grasp the location of the attention target person (P1) requiring protection. On the other hand, the non-relevant person (P3) does not know who the attention target person (P1) is, but can grasp the location of the attention target person (P1) requiring attention through the display unit 252 or the like of the second subscriber 200S2. Thus, e.g., by displaying the location of the attention target person (P1) on a map displayed on a car navigation system mounted on a vehicle or the like or an owned cellular phone or the like, the non-relevant person (P3) can know that it is necessary to pay particular attention to driving or the like in order to pass close to the attention target person (P1), so that traffic accidents are expected to be suppressed.

A-5. Effect of Embodiment

As described above, the publisher 200P of this embodiment can distribute the encrypted publish message PD1 including plaintext topic designation data and cipher message data obtained by encrypting at least a part of the external data to the broker 100 (see FIG. 4). Therefore, the broker 100 can register the cipher message data in the designated topic without requiring the decryption of the cipher message data. Thus, according to the present embodiment, it is possible to distribute the cipher message data to the external device (subscriber 200S) while ensuring confidentiality. That is, by not encrypting the topic, the broker 100 can sort the message according to the topic while encrypting the message data.

In the present embodiment, the external data includes first external data and second external data, and the encryption processing unit 215 can generate cipher message data including plaintext and ciphertext (see FIG. 4) by leaving the first external data in plaintext and encrypting the second external data. Thus, according to the present embodiment, e.g., the highly public first external data of the plaintext and the highly confidential second external data of the ciphertext can be collectively distributed to the external device as the encrypted publish message PD1.

In the present embodiment, the encryption processing unit 215 may generate cipher message data by encrypting the first external data and the second external data by a method in which at least one of the encryption rule and the encryption key is different from each other. Thus, the present embodiment can distribute a plurality of external data encrypted by mutually different encryption methods to an external device collectively as the encrypted publish message PD1.

In the present embodiment, when the encryption determination unit 214 determines that the encryption condition is satisfied (S120: YES), the encryption processing unit 215 generates the cipher message data, and the data distribution unit 217 distributes the encrypted publish message PD1 to the broker 100, and when the encryption determination unit 214 determines that the encryption condition is not satisfied (S120: NO), the data distribution unit 217 distributes the non-encrypted publish message PD2 including topic designation data of plaintext and message data of plaintext to the broker 100. That is, in the present embodiment, on the basis of whether a predetermined encryption condition is satisfied, it is possible to switch between a confidential distribution mode (S180) in which a highly confidential encrypted publish message is distributed to a broker and a public distribution mode (S190) in which a highly public non-encrypted publish message is distributed to a broker. Thus, the present embodiment can implement a Pub/Sub model in which confidentiality and openness of message data are ensured at the same time.

The topic designation data of the encrypted publish message PD1 and the non-encrypted publish message PD2 distributed from the publisher 200P include pattern identification data. Therefore, the subscriber 200S can identify the arrangement pattern of the ciphertext in the encrypted publish message PD1 and the non-encrypted publish message PD2 on the basis of this pattern identification data (see FIG. 6). Thus, e.g., it is possible to make the subscriber 200S correctly perform processing for a publish message in which the arrangement pattern of the ciphertext can be changed at any time without requiring a separate means for transmitting the pattern identification data to the subscriber 200S.

The present embodiment distribute at least one of an encryption rule and an encryption key generated on the publisher 200P side to the subscriber 200S via communication based on the Pub/Sub model. Thus, the encryption rule and the encryption key can be distributed to the subscriber 200S without being restricted by the broker 100, without requiring another communication means, while the encryption rule and the encryption key are determined on the publisher 200P side. Further, it is possible to suppress an increase in the processing load of the broker 100 with respect to encryption.

In this embodiment, only the first subscriber 200S1 knowing the common delimiter in advance can acquire the encryption rule data from the encryption rule publish message PD3 received from the broker 100 (see FIG. 6). This can enhance the confidentiality of the distribution of the encryption rule data to the specific subscriber 200S. The confidentiality of the distribution of encryption rule data to the particular subscriber 200S is particularly important because the communication based on the Pub/Sub-model is an open communication in which all subscribers 200S registered to a topic can subscribe to publish messages for that topic.

In this embodiment, at least one of the encryption rule, the encryption key, and the delimiter is changed on the publisher 200P side (see FIG. 5). This can enhance the confidentiality of the distribution of the encryption rule data to a specific external device.

In this embodiment, the frequency of changing the delimiter, which has a relatively small processing burden associated with the change, is higher than the frequency of changing the encryption rule or the encryption key. This can suppress the processing load accompanying the change of the encryption rule data while enhancing the confidentiality of the distribution of the encryption rule data to a specific external device more effectively.

B. Modifications

The techniques disclosed herein are not limited to the above-described embodiments, and can be modified into various forms without departing from the spirit thereof, e.g., the following modifications are also possible.

The configuration of the communication system 10, the broker 100, and the terminal device 200 in the above embodiment is merely an example, and can be varied in various ways. For example, in the above embodiment, the communication system 10 is configured to include a plurality of subscribers 200S, but may be configured to include one publisher 200P and one subscriber 200S. The terminal device 200 may be configured not to include at least one of the display unit 252 and the operation input unit 256. Further, the broker 100 may configured to be provided with a plurality of information processing devices, and the plurality of information processing devices may cooperate to execute the message management processing.

The above embodiment illustrates a configuration in which the acquisition unit 254 can acquire a plurality of types of external data at the same time, but the acquisition unit 254 may acquire a plurality of types of external data at different times, may acquire only one type of external data, or may acquire a plurality of the same types of external data (e.g., a plurality of temperature data detected at different locations).

The contents of the respective processes in the above-described embodiments are merely examples and can be modified in various ways. For example, in the above embodiment, the terminal device 200 is a general-purpose device that functions as both the publisher 200P and the subscriber 200S, but may be a dedicated device that functions as only one of the publisher 200P and the subscriber 200S.

In the above embodiment, all of one or more external data included in the cipher message data of the encrypted publish message PD1 may be ciphertext. The publisher 200P may encrypt the entire publish message by using a known encryption method (e.g., a standard encryption method based on Transport Layer Security (TLS)) and distribute the encrypted message to the broker 100. Alternatively, the broker 100 may encrypt the entire publish message by a known encryption method and make the subscriber 200S subscribe to the entire publish message.

The encryption information QD may include only one of a decryption rule and an encryption key. The delimiter WD may be a single-character symbol (e.g., a comma or a special symbol) or a character string consisting of a plurality of characters including at least two combinations of alphabets, numbers, and symbols.

Although the above embodiment has described an example in which both the decryption rule and the encryption key are changed in the encryption change process (FIG. 5), only one of the decryption rule and the encryption key may be changed. Although the above embodiment has described an example in which both the encryption information QD and the delimiter WD are changed, only one of the encryption information QD and the delimiter WD may be changed.

Although the processing for one topic has been described in the above embodiment, the processing may be executed for each of a plurality of topics. For example, the publisher 200P may be configured to issue a message transmission request to the broker 100 for each of a plurality of different topics, and to individually execute the processes of FIGS. 4 and 5. The subscriber 200S may be configured to make a message subscription request to the broker 100 for each of a plurality of mutually different topics, and to individually execute the processing of FIG. 6.

In the publishing process of FIG. 4, S130 may be executed at all times without executing S120. In addition, if the arrangement pattern of the ciphertext in the publish message is fixed, the processing of S130 may be omitted. Further, the encryption change process shown in FIG. 5 may not be executed. In this case, in the subscribe process of FIG. 6, S350 may be executed without executing S320.

In the above embodiments, a part of the configuration realized by hardware may be replaced by software, and on the contrary, a part of the configuration realized by software may be replaced by hardware.

REFERENCE SIGNS LIST

10: communication system, 35: latitude, 100: broker, 110, 210: control unit, 112: message management unit, 130, 230: storage unit, 139: 681236 longitude, 152, 252: display unit, 156, 256: operation input unit, 158, 258: interface unit, 190, 290: bus, 200: terminal unit, 200P: publisher, 200S1: first subscriber, 200S2: second subscriber, 200S: subscriber, 212: publishing processing unit, 213: distribution condition determination unit, 214: encryption determination unit, 215: encryption processing unit, 216: topic processing unit, 217: data distribution unit, 218: encryption change determination unit, 219: encryption rule generation unit, 222: subscribe processing unit, 223: subscription condition determination unit, 224: data sorting unit, 225: encryption acquisition unit, 226: decryption processing unit, 254: acquisition unit, NET: communication network, PD1: encrypted publish message, PD2: non-encrypted publish message, PD3: encryption rule publish message

The invention claimed is:

1. A terminal device that performs communication with an external device through a broker based on a publish-subscribe message model, the terminal device comprising: a processor; and a memory including a program that, when executed by the processor, causes the processor to perform functions, the functions including: acquiring external data; encrypting at least a part of the external data to generate cipher message data including ciphertext; generating topic designation data of plaintext, the topic designation data including pattern identification data; and distributing an encrypted publish message including the topic designation data of the plaintext and the cipher message data to the broker, the pattern identification data identifying an arrangement pattern of the ciphertext in the encrypted publish message, wherein the cipher message data is a data string including the ciphertext in which at least one of a plurality of types of the external data is encrypted.

2. The terminal device according to claim 1,
wherein the external data includes first external data and second external data,
wherein the processor is capable of generating the cipher message data including the plaintext and the ciphertext by keeping the first external data in plaintext and encrypting the second external data, and
wherein the processor is further capable of generating the cipher message data by encrypting the first external data and the second external data by a method in which at least one of an encryption rule or an encryption key is different from each other.

3. The terminal device according to claim 1, wherein the functions further include:
determining whether an encryption condition is satisfied,
wherein, when the processor determines that the encryption condition is satisfied, the processor generates the cipher message data and distributes the encrypted publish message to the broker, and
wherein, when the processor determines that the encryption condition is not satisfied, the processor distributes a non-encrypted publish message including the topic designation data of the plaintext and message data of the plaintext to the broker.

4. The terminal device according to claim 3, wherein the pattern identification data identifies the arrangement pattern of the ciphertext in each of the encrypted publish message and the non-encrypted publish message and is included in the topic designation data.

5. The terminal device according to claim 1, wherein the functions further include:
generating encryption rule data including at least one of a decryption rule for decrypting the cipher message data or an encryption key,
wherein the processor distributes the encrypted publish message including the topic designation data and the encryption rule data to the broker.

6. The terminal device according to claim 5,
wherein the encryption rule data includes the decryption rule, the encryption key, and a delimiter which is a delimiter separating the decryption rule and the encryption key and is a plurality of character strings.

7. The terminal device according to claim 6, wherein the functions further include:
determining whether an encryption change condition is satisfied,
wherein, when the processor determines that the encryption change condition is satisfied, the processor generates new encryption rule data, which is obtained by changing at least one of the decryption rule, the encryption key, or the delimiter.

8. The terminal device according to claim 7,
wherein the processor determines whether each of a first encryption change condition and a second encryption change condition, which is more frequently satisfied than the first encryption change condition, is satisfied,
wherein, when the processor determines that the first encryption change condition is satisfied, the processor generates new first encryption rule data obtained by changing at least one of the decryption rule or the encryption key, and
wherein, when the processor determines that the second encryption change condition is satisfied, the processor generates new second encryption rule data, which is obtained by changing the delimiter.

9. The terminal device according to claim 1, wherein the ciphertext includes confidential external data and the plaintext includes public data.

10. The terminal device according to claim 9, wherein
the confidential external data includes personal data,
the personal data includes at least one of a body temperature, a pulse, or location data of a person, and
the public data includes weather data.

11. A non-transitory computer readable medium containing a computer program that causes a computer, provided in a terminal device that performs communication with an external device through a broker based on a publish-subscribe message model, to execute functions, the functions comprising:
acquiring external data;
encrypting at least a part of the external data to generate cipher message data including ciphertext;
generating topic designation data of plaintext, the topic designation data including pattern identification data;
generating an encrypted publish message including the topic designation data of the plaintext and the cipher message data, the pattern identification data identifying an arrangement pattern of the ciphertext in the encrypted publish message; and
distributing the encrypted publish message to the broker,
wherein the cipher message data is a data string including the ciphertext in which at least one of a plurality of types of the external data is encrypted.

12. A communication system that performs communication based on a publish-subscribe message model between a plurality of terminal devices through a broker, the communication system comprising:

the plurality of terminal devices; and the broker, wherein at least a first one of the plurality of terminal devices:

acquires external data;

encrypts at least a part of the external data to generate cipher message data including ciphertext;

generating topic designation data of plaintext, the topic designation data including pattern identification data; and distributes an encrypted publish message including the topic designation data of the plaintext and the cipher message data to the broker, the pattern identification data identifying an arrangement pattern of the ciphertext in the encrypted publish message, wherein at least a second one of the plurality of terminal devices, which is different from the first one of the plurality of terminal devices:

subscribes to the encrypted publish message from the broker; and decrypts the cipher message data included in the encrypted publish message, and wherein the cipher message data is a data string including the ciphertext in which at least one of a plurality of types of the external data is encrypted.

13. A communication method for performing communication based on a publish-subscribe message model between a plurality of terminal devices through a broker, the communication method comprising:

by at least a first one of the plurality of terminal devices, which conducts a publishing process:

acquiring external data;

encrypting at least a part of the external data to generate cipher message data including ciphertext;

generating topic designation data of plaintext, the topic designation data including pattern identification data;

generating an encrypted publish message including the topic designation data of the plaintext and the cipher message data, the pattern identification data identifying an arrangement pattern of the ciphertext in the encrypted publish message; and distributing the encrypted publish message generated by the data generation process to the broker; and by at least a second one of the plurality of terminal devices, which is different from the first one of the plurality of terminal devices and which conducts a subscribe process:

subscribing to the encrypted publish message from the broker; and decrypting the cipher message data included in the encrypted publish message, wherein the cipher message data is a data string including the ciphertext in which at least one of a plurality of types of the external data is encrypted.

* * * * *